(No Model.)
H. F. NEWELL.
CREAMING CAN.
No. 320,385. Patented June 16, 1885.
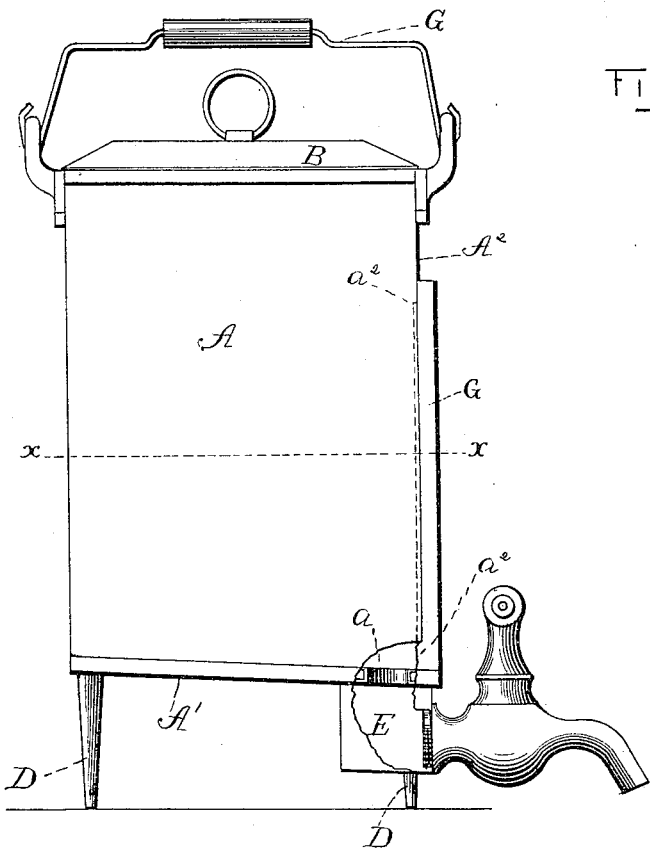
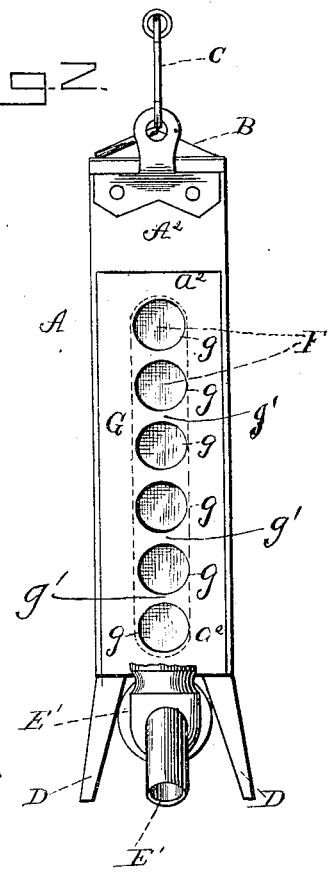
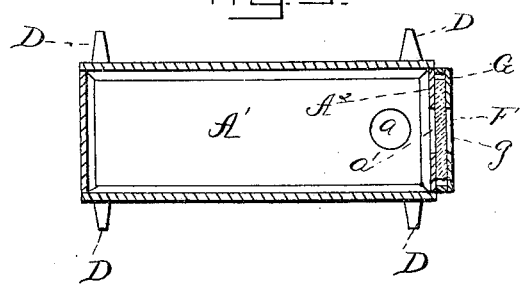
WITNESSES:
N. A. Clark
P. B. Turpin
INVENTOR:
Herman F. Newell
By R. S. & A. P. Lacey
ATT'YS

UNITED STATES PATENT OFFICE.

HERMAN F. NEWELL, OF FLUSHING, MICHIGAN.

CREAMING-CAN.

SPECIFICATION forming part of Letters Patent No. 320,385, dated June 16, 1885.

Application filed June 2, 1884. (No model.)

*To all whom it may concern:*

Be it known that I, HERMAN F. NEWELL, a citizen of the United States, residing at Flushing, in the county of Genesee and State of Michigan, have invented certain new and useful Improvements in Creaming-Cans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to milk-coolers or creaming-cans; and it consists in the novel construction, combination, and arrangement of the several parts, as will be hereinafter more fully described and claimed.

In the drawings, Figure 1 is a side elevation; Fig. 2, a front elevation of my cooler. Fig. 3 is a transverse section on line $x$ $x$, Fig. 2, all of which will be described.

The can A is made in the elongated cross-sectional shape shown, and preferably of a height about one and one-half the length of same. My object in making the can in this elongated or narrowed form is to so dispose the body of milk that all portions thereof will be cooled during the exposure of the can. I thus overcome the difficulty common in ordinary cooling-cans—namely, the difficulty of cooling the middle portion of the milk. This I accomplish by the simple form of can shown. This can I provide with a lid, B, and bail or handle C, by which it may be easily carried, or by which it may be suspended from an elevated support, as will be understood. Legs D depend from the lower end of the can and hold the bottom A' thereof clear of the floor or other support on which the can may be rested. By thus elevating the bottom of the can I secure the exposure of said bottom to the cooling influence of the water when the can is placed in a water tank or vessel and to the air when placed in a cool cellar, as will be understood. At the forward edge of the can I form a discharge-opening, $a$, through the bottom A', and I preferably incline this bottom toward said discharge-opening, so that the contents and milk will all pass out of the can without tilting the same. A discharge-chamber, E, is secured on the under side of the can between the forward legs and below the opening $a$, through which it communicates with the can through said opening. This chamber receives the milk and cream and discharges the same by means of a cock, E', which may be of any desired form. The front of the can is provided with sight-windows, which I preferably form in the manner presently described. It will be noticed that the cream-line can be seen through this window, and when all the milk has passed into the discharging-chamber the user has time while the milk is passing from said chamber to prepare to change receptacles, so the cream may be drawn into a separate vessel from the milk, as is desirable. I prefer to secure the window by cutting the front face, A², of the can with a vertically-elongated slot, $a'$, which is continuous from $a^2$ to $a^2$, as indicated in dotted lines, Figs. 1 and 2. A glass or other transparent plate, F, is secured over this slot or opening $a'$, and cemented or otherwise suitably secured and packed to prevent leakage. A housing or case, G, is secured over the glass plate and serves as a protection therefor, and also to prevent said plate from being knocked off the can. A series of port-holes or openings, $g$, are formed through the face-plate of this casing at close intervals, so that the line of cream may be determined as well as the quality of fluid. I arrange this series in a line with the direction of elongation of slot $a'$ and coinciding therewith, as shown. These openings are not connected, it will be seen, but are separated by an intermediate portion, $g'$, of plate $g$, and thereby I protect the glass against damage and make practical the use of the cheap common pane-glass, instead of the expensive plate-glass now commonly used. I also obviate the placing of the glass within the can, and by the continuous open slot $a'$ dispense with all edges or projections against which the milk and cream would be stopped, which would also render the can difficult to clean.

In practice I design to make my cans of about the following dimensions, namely: twenty inches high, fourteen inches long, and two and one-half inches thick.

In use I design to place my cans in vessels of cool water or in cool cellars or vaults, so the cool water or air will quickly raise the cream, the form of the can being such that all parts of the milk are quickly affected. I also design to suspend my cans in the cool water of wells, and it will be found useful in any of the described applications.

Having thus described my invention, what I claim, and desire to secure by Letters Patent, is—

The improved creaming-can herein described, consisting of the body or can flattened in cross-section, and having its front plate provided with a vertical slot, $a'$, and having its bottom A′ inclined downward toward its forward end, and provided near such end with an opening, $a$, the legs D, whereby such can is held above the supporting-surface, the transparent plate F, placed over the slot $a'$, the retaining-plate G, secured over the plate F, and provided with a vertical series of separated openings, $g$, and the discharge-chamber located below the can and communicating therewith through the opening $a$, and having a discharge-pipe and a controlling-cock therein, substantially as and for the purposes specified.

In testimony whereof I affix my signature in presence of two witnesses.

HERMAN F. NEWELL.

Witnesses:
 ALANSON NILES,
 W. E. HOUGH.